United States Patent [19]
Byrne

[11] 3,942,104
[45] Mar. 2, 1976

[54] CELL BALANCE DETECTOR FOR ELECTROLYTIC CELL ASSEMBLIES

[75] Inventor: Paul Bradway Byrne, Warren, N.J.

[73] Assignee: Engelhard Minerals & Chemicals Corporation, Murray Hill, N.J.

[22] Filed: May 3, 1974

[21] Appl. No.: 466,715

[52] U.S. Cl. ............................ 324/30 R; 204/195 R
[51] Int. Cl.² .......................................... G01N 27/42
[58] Field of Search...... 324/29.5, 30, 30 B, DIG. 1; 320/2, 21, 22, 31; 204/195 R

[56] References Cited
UNITED STATES PATENTS

| | | | |
|---|---|---|---|
| 2,621,231 | 12/1952 | Medlar et al. ........................ | 324/29.5 |
| 2,711,995 | 6/1955 | Sard.............................. | 324/DIG. 1 |
| 3,305,754 | 2/1967 | Oaks et al............................ | 320/48 |
| 3,315,140 | 4/1967 | Dadin .................................. | 320/48 |
| 3,374,672 | 3/1968 | Horne .............................. | 324/30 B |
| 3,392,333 | 7/1968 | Blondfield............................. | 324/30 |
| 3,493,837 | 2/1970 | Sparks et al. .......................... | 320/31 |
| 3,740,636 | 6/1973 | Hogrefe .................................. | 320/2 |

*Primary Examiner*—R. V. Rolinec
*Assistant Examiner*—Michael J. Tokar

[57] ABSTRACT

A system is provided for detecting an imbalance in operating voltage between two sodium hypochlorite cell assemblies electrically connected in series. Each cell has associated with it, in parallel, a resistor and each of the resistors are equal in value. A detector is connected between the junction between the resistors and the junction between the cells which detects an increase or a decrease in the operating voltage of either of the cells.

8 Claims, 3 Drawing Figures

CELL BALANCE DETECTOR FOR ELECTROLYTIC CELL ASSEMBLIES

BACKGROUND OF THE INVENTION

Algae, slime and bacteria concentrations often plague water storage or supply systems such as sewage systems, cooling tower complexes, potable water supplies, systems for fire prevention, irrigation, etc. Ocean water storage or supply systems will foul with algae, slime and numerous additional organisms such as barnacles, tunicates, hydroids, bryozoa and others. The proliferation of these organisms is prevented by the application of chlorine. Chlorine gas, although economical, is risky to store and use. Anhydrous liquid chlorine is also risky to store and to use and has a high thermal coefficient of expansion so that even moderate elevation in temperature could cause hydrostatic rupture of a container tank.

Sodium hypochlorite is the alternative form of chlorine that comes closest to being economically feasible as a chlorinating agent. Although the relative safety of sodium hypochlorite is well known, it still presents storage problems because of the large quantities that must be used. A solution to the storage and safety problem is to provide a system that can produce sodium hypochlorite as needed with no storage required.

In copending U.S. patent application Ser. No. 357,555 filed May 7, 1973, assigned to the assignee of this application, there is disclosed a generator for the production of sodium hypochlorite on demand in whatever quantities are required. In that application a sodium hypochlorite generator is disclosed in which there are inner and outer cylindrical members defining an annular space through which electrolyte flows. One of the cylindrical members is formed of two parts, one being an anode and the other a cathode insulated from each other, and the other cylindrical member forms a bipolar element operating in conjunction with the anode and cathode of the first cylindrical member. In one embodiment shown in that application, the bipolar cylindrical element is the outer cylindrical member, and in the second and preferred embodiment the bipolar element is the inner cylindrical member.

The improvement of this invention may be used with either of those embodiments. Reference herein in the specification or claims to a "cell" or "cell assembly" means a hypochlorite generating cell assembly of the type disclosed in that copending application.

BRIEF DESCRIPTION OF THE INVENTION

The improvement of this invention may be used in conjunction with at least two hypochlorite cell assemblies which are electrically connected in series. Those cells are preferably also connected in series hydraulically.

When two or more cell assemblies are used to produce sodium hypochlorite, after a period of time, one or more of the cells may break down. Such a breakdown may come from a number of sources, including loss of cell anode coating may occur after extended use due to normal wear of the coating and may be aggravated by operation of the cell with abrasive electrolyte, low flow, foreign chemicals, excessive DC voltage or with an AC voltage. In addition, cell breakdown may occur because of mechanical damage, and the cell may be shorted by debris or from deposits from the electrolyte because of low flow operation. When a cell is partially shorted by deposits from the electrolyte, its voltage will drop. When the anode coating in the cell is partially lost, the cell voltage will increase. Therefore, in order fully to detect cell breakdown a detector must sense both an increase or a decrease in the standard operating voltage of the cell.

The improvement of this invention provides a simple and inexpensive means for detecting both an increase or a decrease in the operating voltage of any cell in a sodium hypochlorite cell assembly (involving at least two such cells electrically connected in series).

The cell voltage balance detector of this invention is briefly described by reference to two hypochlorite cells electrically connected in series, but it may be used with any number of such cells in excess of one. When two hypochlorite cells are electrically connected in series and are used to electrolyze brine, a source of DC current is applied across the two cells. When operating properly, each cell has a normal voltage drop equal to about half the applied voltage. The cathode of the first cell is electrically connected with the anode of the second cell, providing a junction between the two cells. In the detector system of this invention, two resistors equal in value are connected in series with each other and in parallel with the cells across the leads to and from the power source. The junction between the resistors is connected to the cell junction between the two cells. As the resistors are equal in value, the voltage drop across each is the same as the voltage drop across the cell with which it is connected in parallel. A detector is connected between the junction between the two resistors and the junction between cells. When there is an increase or decrease in the operating voltage in either of the two cells, the detector senses this and produces an imbalance signal which is registered on a meter and may be used to disconnect the power source to the cells.

DETAILED DESCRIPTION OF A PREFERRED EMBODIMENT OF THE INVENTION

Figure 1:
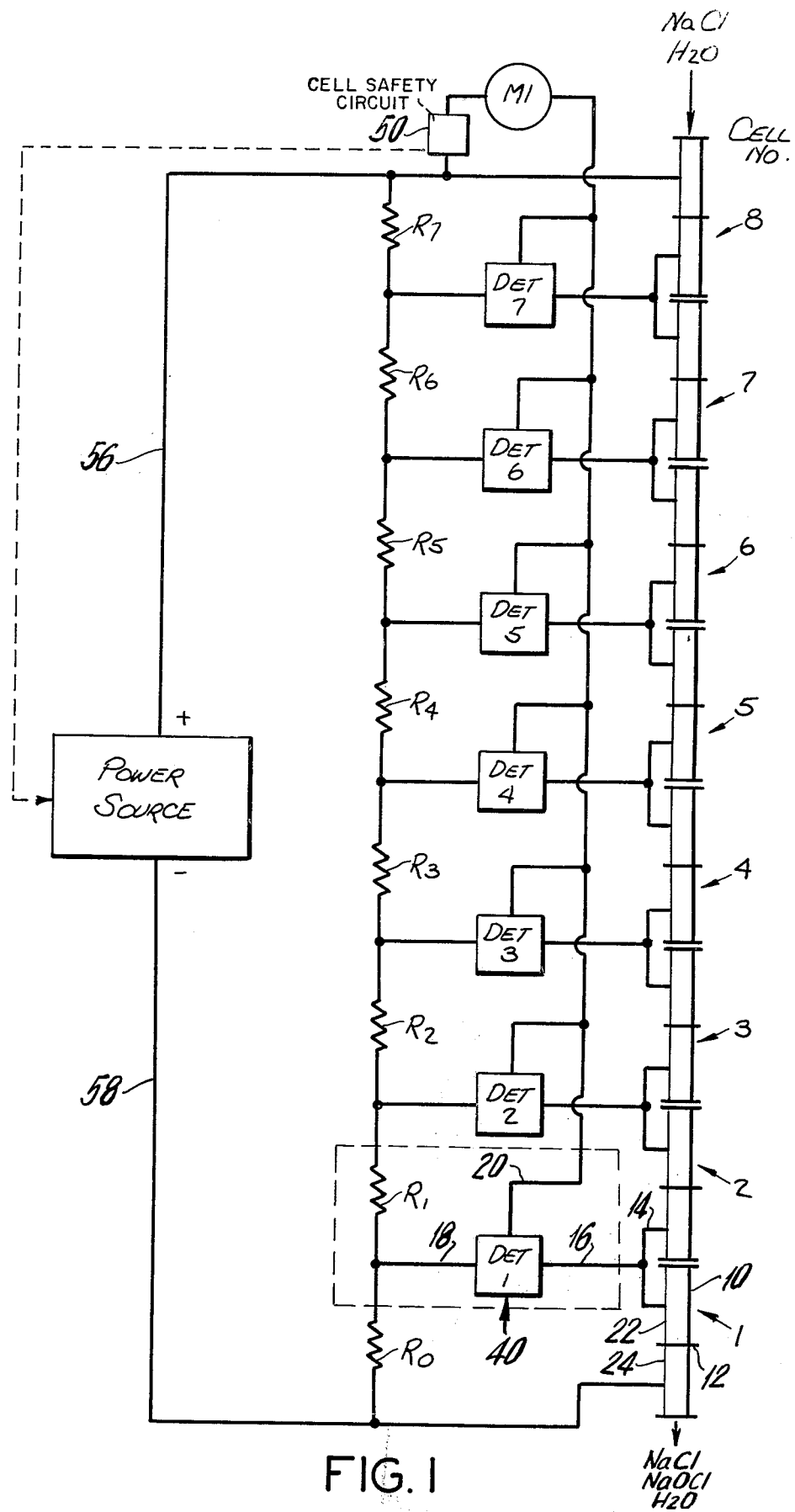
FIG. 1 is a schematic drawing which shows eight sodium hypochlorite cell assemblies hydraulically and electrically connected in series, in which the improvement of this invention is used to detect an increase or decrease of voltage in any of those cells.

FIG 1 shows eight hypochlorite generating cells connected hydraulically and electrically in series. These cells are of the type shown in copending U.S. patent application Ser. No. 357,555 filed May 7, 1973. Each of the eight cells shown in FIG. 1 includes an inner cylindrical member and an outer cylindrical member. Referring to cell 1 in FIG. 1 that outer cylindrical member is designed as 10. The inner and outer cylindrical members of each of cells 1 through 8 in FIG. 1 define an annular space through which electrolyte is passed and electrolyzed when the cells are operated. The DC power source typically supplies 200 amps at 112 volts. As shown in FIG. 1 a salt solution is introduced into cell 8, passes through each of the cells and is electrolyzed to produce sodium hypochlorite solution which passes from the exit of cell 1. Each of those cells 1 through 8 are identical and all of them are described by reference to cell 1. The outer cylindrical member 10 of cell 1 is divided into two portions, portion 22 which is an anode and portion 24 are insulated from each other by insulation which is schematically designated as 12 in FIG. 1. The inner cylindrical member of cell 1 is of the type shown in copending U.S. patent application Ser. No. 357,555 filed May 7, 1973 and is not shown in FIG. 1. That inner cylindrical member functions as a bipolar element operating in conjunction with the outer member 10 to form an electrolytic cell. The power source shown in FIG. 1 furnishes direct current to the cell assemblies 1 through 8 and typically would furnish a current of 200 amperes at 112 volts. The positive side of the power source is connected electrically to the anode portion of cell 8 and the negative side of the power source is connected to the cathode portion of cell 1. The cathode portion of cell 8 is connected to the anode portion of cell 7 and each of the remaining cells are similarly connected from their cathode portion to the anode portion of the next cell. Referring to FIG. 1, lead 14 connects the cathode portion of cell 2 to the anode portion of cell 1 which is designated as 22 in FIG. 1. As the brine is passed through the eight cell assemblies, direct current from the power source passes through the electrolyte of each cell, electrolyzing the salt solution to sodium hypochlorite solution. The leads from one cell to its adjacent cell, such as 14 which links cell 2 with cell 1, carry the current from one cell to the next one. As each of the eight cell assemblies are identical, when they are operating properly the voltage applied across cells 1 through 8 is divided equally among each of the eight cells. For example, if the voltage from the power source is 112 volts the operating voltage across each cell is 14 volts approximately.

Referring to FIG. 1 the resistors shown as $R_0$ through $R_7$ are equal in value, and preferably comprise precision resistors having a value of 240 ohms ± 1%. With a power source having a voltage of 112 volts the drop across each resistor is also approximately 14 volts. Referring to cells 1 and 2, lead 14 which connects cell 2 with cell 1 is electrically connected with lead 16 which is connected to a detector, DET 1, FIG. 1. DET 1 includes two transistors (FIG. 2), one of which transmits current (an imbalance signal) to M1 when cell voltage drops and the other of which passes a current to M1 when the cell voltage increases. DET 1, in turn, is electrically connected by lead 18 to a junction between resistors $R_0$ and $R_1$. The detector has another lead connected to it designated as 20 in FIG. 1 and this, in turn, is connected with a meter shown as M1 in FIG. 1 and in FIGS. 2 and 3. When cell 1 is operating properly at 14 volts, the voltage on either side of DET 1 is the same and there is not any current flow. However, if the voltage in cell 1 drops because of a malfunction in it (or an increase in voltage in cell 2) then current passes from lead 18 to lead 16 through DET 1 and through lead 20 to M1. For example, if there is a deposit from the electrolyte in cell 1 and it is partially shorted, its voltage will drop passing a current through one transistor from DET 1 to M1. However, should the anode coating in portion 22 of cell 1 be partially lost, the cell voltage will increase and current (an imbalance signal) will pass through DET 1 and through the other transistor in that detector.

It is important that DET 1 and each of the other detectors used in the system be capable of detecting current flow in either direction between leads 16 and 18. In the improvement of this invention, DET 1, and each of the other detectors used in carrying out the improvement, detects current flow in either direction through it. When the voltage in cell 1 departs from its standard, either upwardly or downwardly, a current flows into DET 1. When this occurs, this current flow registers in the meter shown in M1 in FIG. 1. If the increase or decrease in voltage in cell 1 is of a sufficient magnitude then the current flow through lead 20 operates to shut down the whole cell assembly system through the circuit of FIG. 3. That circuit and the operation of the detectors is hereafter described in detail.

Figure 2:
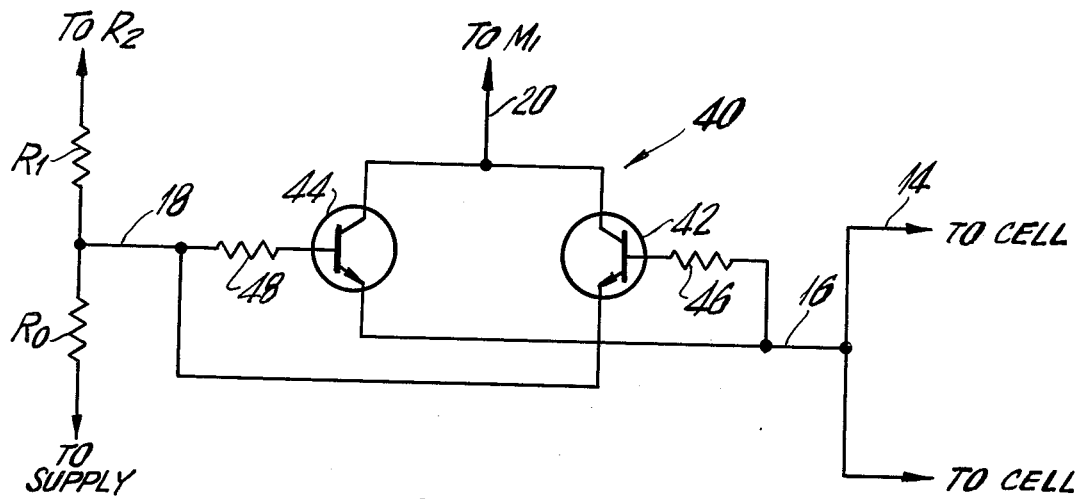
FIG. 2 is a schematic circuit wiring diagram of the detectors, such as DET 1, shown in FIG. 1.

The detectors (DET 1 through 7) are identical in construction and a schematic circuit wiring diagram of a detector (such as DET 1 in FIG. 1) is shown in FIG. 2. The detector circuit is designated generally by the reference numeral 40 and includes NPN transistors 42 and 44. Lead 16 is connected directly to the emitter electrode of the transistor 44 and is also connected to the base electrode of transistor 42 through a resistor 46. Similarly, the lead 18 is connected to the emitter electrode of the transistor 42 and is connected to the base electrode of the transistor 44 through a resistor 48. The collector electrodes of the transistors 42 and 44 are connected together and to the lead 20 which, in turn, is connected to the meter M1.

Under normal conditions, the potentials on the leads 16 and 18 are equal so that the transistors are in their nonconducting state. However, if the associated cell becomes unbalanced, a difference in potential will exist between the leads 16 and 18 thereby causing one of the transistors to conduct. For example, if one of the cells connected to the lead 16 is partially shorted by debris or the like, the voltage across the cell will drop. Accordingly, when the cell is cell 1 of FIG. 1, the potential on the lead 18 will exceed the potential on the lead 16 and the transistor 44 will begin conducting thereby supplying current to the meter M1 through the lead 20. On the other hand, if the anode coating in the cell is partially lost, for example, the cell voltage will increase thereby causing the potential on the lead 16 to exceed the potential on the lead 18. When this potential exceeds the drop across the base-emitter junction of the transistor 42, the transistor 42 will begin conducting. Thus, current will again flow to the meter M1 through the lead 20 whereby a cell imbalance will again be indicated.

Figure 3:
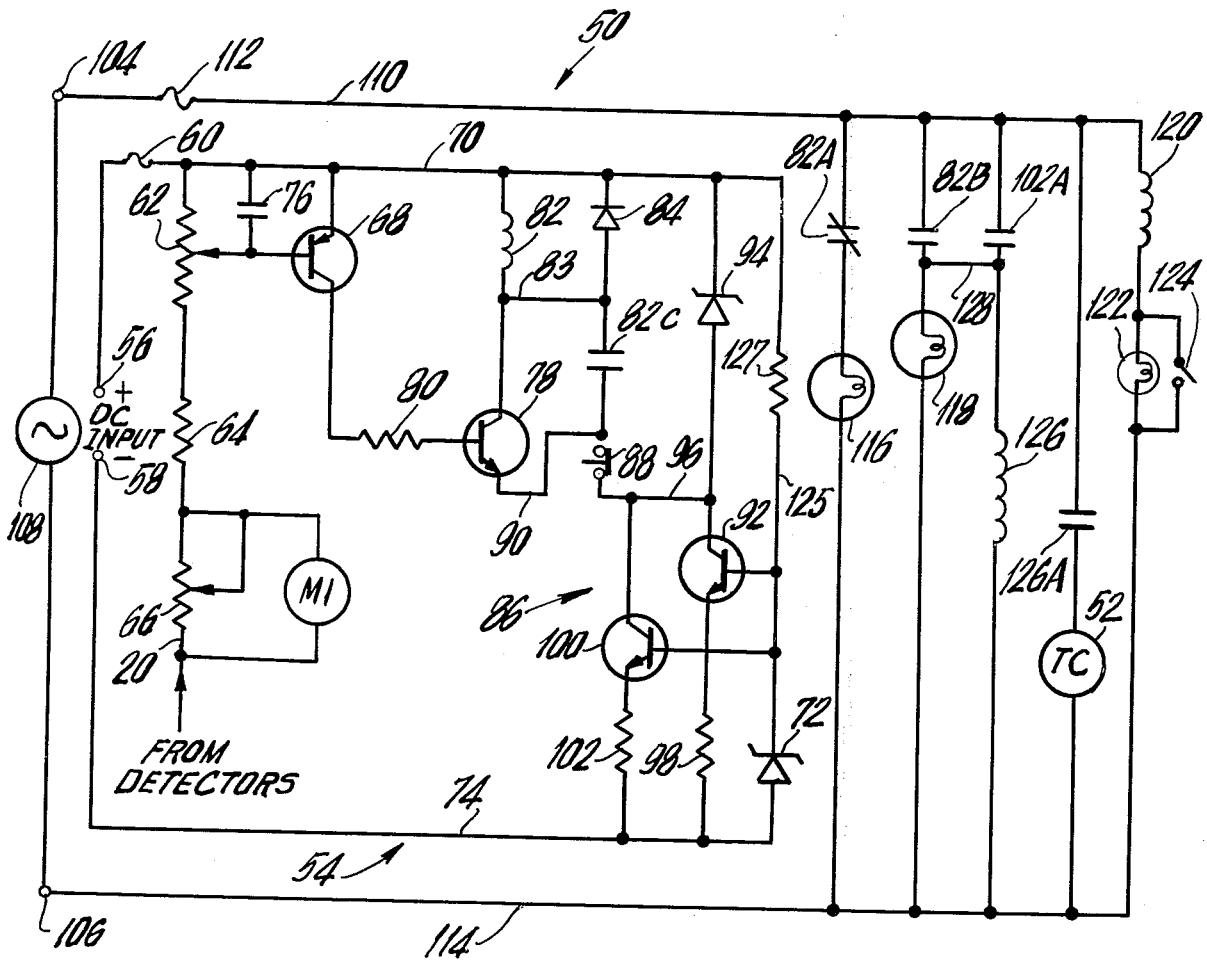
FIG. 3 is a circuit connected in series with M1 (shown in FIG. 1). When there is an imbalance in the cell voltage, this is detected by DET 1 and is registered on M1. When there is an imbalance above a set level, the circuit shown in FIG. 3 cuts out the DC power supply to the cells.

Also connected to the detectors via the lead 20 is a cell safety circuit designated generally by the reference numeral 50 in FIG. 1 and FIG. 3. The cell safety circuit, which is in series with M1, see FIG. 3, includes a circuit breaker trip coil 52 which controls the operation of a circuit breaker in the cell power supply (designated "Power Source" in FIG. 1). As noted in detail below, when a cell imbalance is detected, the trip coil 52 is energized to operate the circuit breaker thereby to disconnect the power supply from the cells.

More specifically, the cell safety circuit 50 comprises a control circuit designated generally by the reference numeral 54 having a pair of input terminals 56 and 58 adapted to be connected to the positive and negative electrodes, respectively, of the same DC source of potential powering the hypochlorite generating cells.

The terminal 56 is connected through a fuse 60 to one side of a series circuit comprising potentiometer 62, resistor 64, meter M1, and a potentiometer 66. The outer side of the potentiometer 66 is connected to the lead 20 and thereby to the detectors. The sliding arm of the potentiometer 66 is connected to the junction of the potentiometer 66 and the resistor 64. The sliding arm of the potentiometer 62 is connected to the base electrode of a PNP transistor 68, the emitter electrode of which is connected to a lead 70 that is connected between the junction of the potentiometer 62 and fuse 60 and resistor 127. Lead 125 connects resistor 127 and the cathode electrode of a zener diode 72. The anode electrode of the zener diode is connected to the terminal 58 by a lead 74. A capacitor 76 is also connected between the lead 70 and the base electrode of the transistor 68.

The collector electrode of the transistor 68 is connected to the base electrode of a NPN transistor 78 through a resistor 80. Connected between the lead 70 and the collector electrode of the transistor 78 is a relay coil 82. The relay coil 82 controls the operation of normally closed contacts 82 and normally open contacts 82B and 82C of the relay.

Also connected to the lead 70 is the cathode electrode of a diode 84, the anode electrode of which is connected to one side of the contacts 82C. The other side of the contacts 82C is connected to a current regulating circuit 86 through a normally closed pushbutton reset switch 88. The emitter electrode of the transistor 78 is connected to the junction of the switch 88 and the contacts 82C by a lead 90 and the collector electrode is connected to the junction of the diode 84 and contacts 82C. Hence, the contacts 82C are connected in parallel with the collector-emitter path of the transistor 78.

The current regulating circuit 86 comprises an NPN transistor 92, the base electrode of which is connected to the lead 125. The collector electrode of the transistor 92 is connected to the lead 70 through a zener diode 94 which is polarized so that the anode electrode thereof is connected to the collector electrode of the transistor. The collector electrode of the transistor 92 is also connected to the switch 88 by a lead 96. The emitter electrode of the transistor is connect to the lead 74 through a resistor 98. The regulating circuit 86 further includes an NPN transistor 100, the base electrode of which is also connected to the lead 125 and the collector electrode of which is connected to the lead 96. The emitter electrode is connected to the lead 74 through a resistor 102. It is noted that the zener diode 72 also forms a part of the current regulating circuit. The current regulating circuit 86 is conventional in construction and maintains a desired potential across the fixed resistors 98 and 102, thereby maintaining a constant current through transistors 92 and 100. The zener regulating diode 94 forms a conventional voltage regulator, maintaining a desired potential of approximately 13 volts across the transistors 68 and 78.

The cell safety circuit 50 further includes a pair of input terminals 104 and 106 that are adapted to be connected to a source of AC potential 108. A lead 110 is connected to the terminal 104 through a fuse 112 and a lead 114 is connected to the input terminal 106. Connected between the leads 110 and 114 is a series circuit comprising the relay contacts 82 and a lamp 116. Additionally, a series circuit comprising relay contacts 82B and a lamp 118 connected between the leads 110 and 114. Also connected between the leads is a series circuit comprising a relay 120 and a lamp 122. Connected in parallel with the lamp 122 is a normally open flow switch 124 that is actuated by the flow of electrolyte through the cells. To be more specific, when the flow of electrolyte decreases to a pre-set value, the switch 124 will close thereby placing a short circuit across the lamp 122. The relay coil 120 controls the operation of normally open relay contacts 120A.

The contacts 120A of the relay 120 are connected in series with a relay coil 126 between the leads 110 and 114. A lead 128 connects the junction of relay contacts 82B and the lamp 118 with the junction of the relay contacts 120A and the relay coil 126. The relay coil 126 controls the operation of normally open contacts 126A which are connected in series with the trip coil 52 between the leads 114 and 110.

In operation, assuming that there is no imbalance in the cells, the transistor 68 is nonconducting so that the relay contacts 82A will remain closed thereby providing a current path through the lamp 116 from the source 108. The illumination of the lamp 116 indicates proper operation of the circuit to the operator. However, when a cell imbalance occurs current will flow in the lead 20 thereby biasing the transistor 68 into conduction. The point at which conduction of the transistor 68 will begin may be selected by properly adjusting the sliding arms of the potentiometers 62 and 66. The transistor 68 amplifies the imbalance signal and applies the same to the transistor 78 which is thereby rendered conductive. When the current through the relay coil 82 reaches the operating value, the contacts 82B and 82C close and the contacts 82A open. A holding circuit is established about the relay coil 82 from the lead 70 through the coil 82, lead 83 now closed contacts 82C, the switch 88 and the current regulating circuit 86 to lead 74. Moreover, relay coil 126 will now be energized through the energized lead 110, now closed contacts 82B, lead 128 and the relay coil to the return lead 114. Hence, contacts 126A will close thereby placing the trip coil 52 across the energized leads 110 and 114 to cause the circuit breaker within the power supply to trip or open. Additionally, a current path will be established through the lamp 118 through the closed contacts 82B to signify to the operator that the power supply has been disconnected from the cells. The opening of the contacts 82A disconnects the lamp 116 from the leads 110 and 114.

As noted hereinabove, the cell safety circuit 50 also includes means for deenergizing the power supply when the electrolyte flow falls below a preselected value. Thus, under normal flow conditions, the switch 124 is open and the voltage drop across the series circuit comprising the relay coil 120 and the lamp 122 is substantially across the lamp 122 in view of its high resistance relative to the relay coil 120. The relay coil 120 is, therefore, effectively deenergized. However, when the switch 124 closes in response to decrease electrolyte flow, the full potential between the leads 110 and 114 is applied to the relay coil 120 thereby energizing the relay coil which, in turn, causes the contacts 120A to close. Closure of the contacts 120A again energizes the relay coil 126 which, in turn, energizes the rip coil 52 through the now closed contacts 126A. As a result, the circuit breaker trips to again disconnect the power supply from the cells.

I claim:

1. A sodium hypochlorite cell voltage balance detector assembly comprising a pair of input terminals adapted to be connected to a DC source of potential, first and second arms connected in parallel with each other between said pair of input terminals, said first arm comprising a plurality of serially connected cells whereby adjacent cells are connected together at cell junctions and each cell has a normal voltage drop thereacross when the cell is operating properly, said second arm comprising a plurality of serially connected impedances in one-to-one correspondence with said plurality of cells and wherein adjacent impedances are connected together at impedance junctions, each one of said plurality of impedances being associated with a respective one of said plurality of cells and having a value such that the voltage drop across the impedance is equal to the normal voltage drop across said associated cell, detecting means connected between an impedance junction and the corresponding cell junction and responsive to voltage variations between the junctions to which said detecting means is connected for producing an imbalance signal, said detecting means comprising first amplifying means connected between said impedance junction and said corresponding cell junction for producing said imbalance signal when said cell voltage drop increases above said cell normal voltage drop, second amplifying means connected between said impedance junction and said corresponding cell junction for producing said imbalance signal when said cell voltage drop decreased below said cell normal voltage drop, meter means for monitoring said imbalance signal, and control means responsive to a predetermined value of said imbalance signal for disconnecting the source of potential from said plurality of cells.

2. A cell voltage balance detector assembly as in claim 1, and a plurality of detecting means, each one of said plurality of detecting means connected between a respective impedance junction and the corresponding cell junction and being responsive to voltage variations between the junctions to which said detecting means is connected for producing an imbalance signal.

3. A cell voltage balance detector assembly as in claim 1, and indicating means connected to said detecting means responsive to said imbalance signal for indicating a voltage imbalance.

4. A cell voltage balance detector assembly as in claim 1, in which said control means comprises a circuit breaker operable from a closed state in which said pair of input terminals are adapted to be connected with the source of potential to an open state whereby said pair of input terminals are adapted to be disconnected from the DC source of potential, and a trip coil responsive to said imbalance signal for operating said circuit breaker to the open state.

5. A cell voltage balance detector assembly as in claim 1, in which said plurality of cells are hydraulically connected together to provide a path for the flow of an electrolyte therethrough, said control means further comprising flow means responsive to the rate of flow of the electrolyte below a preselected value for disconnecting said pair of input terminals from the source of potential.

6. A cell voltage balance detector as in claim 1, in which the normal voltage drop across said cells are equal in value, and said plurality of impedance are equal in value.

7. A cell voltage balance detector as in claim 1, in which the normal voltage drop across each one of the plurality of cells are equal, and said plurality of impedances comprise precision resistors of equal value.

8. A cell voltage balance detector as in claim 1, in which said first and second amplifying means respectively comprise first and second transistors each having an emitter, a collector and a base electrode; a first lead connecting together said emitter electrode of said first transistor and said base electrode of said second transistor and said cell junction; a second lead connecting together said emitter electrode of said second transistor and said base electrode of said first transistor and said impedance junction; and a third lead connecting together the collector electrodes of said first and second transistors and adapted to be connected to said source of potential, whereby said imbalance signal appears on said third lead.

* * * * *